United States Patent
Ide

(10) Patent No.: US 7,253,873 B2
(45) Date of Patent: Aug. 7, 2007

(54) DYNAMIC GAIN EQUALIZER

(75) Inventor: Masafumi Ide, Saitama (JP)

(73) Assignee: Citizen Watch Co., Ltd., Tokyo (JP)

( * ) Notice: Subject to any disclaimer, the term of this patent is extended or adjusted under 35 U.S.C. 154(b) by 308 days.

(21) Appl. No.: 10/509,699

(22) PCT Filed: May 12, 2003

(86) PCT No.: PCT/JP03/05864

§ 371 (c)(1),
(2), (4) Date: Sep. 30, 2004

(87) PCT Pub. No.: WO03/098332

PCT Pub. Date: Nov. 27, 2003

(65) Prior Publication Data

US 2005/0110942 A1    May 26, 2005

(30) Foreign Application Priority Data

May 15, 2002    (JP)    ............................. 2002-139655

(51) Int. Cl.
G02F 1/13    (2006.01)
(52) U.S. Cl. ....................................... 349/196; 349/197
(58) Field of Classification Search ................ 349/196, 349/197
See application file for complete search history.

(56) References Cited

U.S. PATENT DOCUMENTS 5,321,539 A * 6/1994 Hirabayashi et al. ........ 349/198
5,414,540 A * 5/1995 Patel et al. .................. 349/196
5,942,157 A * 8/1999 Sutherland et al. ......... 252/582
5,943,129 A * 8/1999 Hoyt et al. .................. 356/318
6,124,920 A * 9/2000 Moseley et al. ............ 349/201
6,208,774 B1 * 3/2001 Sorin et al. ................... 385/11

FOREIGN PATENT DOCUMENTS

| JP | 8-5976 | 1/1996 |
| JP | 8-5977 | 1/1996 |
| JP | 8-510564 | 11/1996 |
| JP | 9-33878 | 2/1997 |
| JP | 2001-188023 | 7/2001 |
| JP | 2002-214591 | 7/2002 |

* cited by examiner

*Primary Examiner*—Toan Ton
(74) *Attorney, Agent, or Firm*—Westerman, Hattori, Daniels & Adrian, LLP.

(57) ABSTRACT

A dynamic gain equalizer (1) comprises a spectroscope (4) for separating a light entering from an incoming end, a liquid crystal optical switch (5) for receiving spectral components separated by the spectroscope (4), and a lens system (3) arranged between the incoming end and the spectroscope (4) and/or between the spectroscope (4) and the liquid crystal optical switch (5). The liquid crystal optical switch (5) changes the light intensities of incoming spectral components for each wavelength and sends them out. The dynamic gain equalizer selectively controls the spectral components of specific wavelengths and equalizes the light intensities for the wavelengths without using a mechanical moving part such as a MEMS.

11 Claims, 12 Drawing Sheets

(a)

(b)

(c)

(a)

(b)        (c)

(a)

31a 32a 33a  34  33b 32b 31b 35

(b)

31a 32a 33a  34  33b 36 37 31b (c)

31a 32a 33a  34  33b 38 31b (a)

(b)

DYNAMIC GAIN EQUALIZER

TECHNICAL FIELD

The present invention relates to a gain equalizer that compensates for the wavelength dependence of a gain in optical amplification, and more particularly to a dynamic gain equalizer that can dynamically compensate for a gain.

BACKGROUND ART

Wavelength Division Multiplexing (WDM) is known in the optical communication field. In the wavelength division multiplexing, alight of two or more optical signals having different wavelengths is transmitted over an optical fiber and then demultiplexed by wavelength at the receiving end. This sometimes results in generating noises that affect optical signals having different wavelengths. Especially, when the gain of an optical fiber amplifier that amplifies a signal light has wavelength dependence, a variation is generated in the signal light intensity after the light is amplified. Therefore, there is a need for compensating for this variation.

To compensate for such a variation in the light intensity, it is known that a gain equalizer for an optical fiber amplifier is provided at the output side of the optical fiber amplifier. This gain equalizer uses a loss filter to reduce the wavelength dependence of the intensity of an amplified signal light and thereby smoothes the wavelength dependence.

A conventional loss filter amplifies a light using a gain medium such as a rare-earth doped optical fiber and, after that, filters the amplified light. The filtering characteristics of this loss filter depend on the final gain characteristics of the whole gain medium. If the gain characteristics of the whole gain medium have the wavelength dependence such as the one indicated by curve A in FIG. 11(a), the filtering characteristics of the loss filter are set so that the filtering characteristics have the wavelength dependence such as the one indicated by curve B in FIG. 11(b). Curve B is set so that its profile has a heavy loss in the part where the gain of curve A is relatively high. The light intensity of the light amplified by the gain medium has the wavelength dependence such as the one indicated by curve A. The loss filter, which partially reduces the part of the light intensity where it is relatively high, gives a light having the characteristics indicated by curve C in FIG. 11(c).

As described above, the filtering characteristics of the conventional loss filter are based on the wavelength dependence of the gain of the whole gain medium, and it is assumed that the wavelength dependence does not vary but remains static.

However, the wavelength dependence of an optical fiber or a gain medium changes over time. This means that a loss filter with fixed filtering characteristics, if used for compensating for the wavelength dependence, generates a variation in the light intensity as the time goes by. To configure an optical network, a ring structure or a mesh structure must be formed using optical fibers. In such an optical network, the route length may change according to how the route through which a light passes is switched. In this case, a variation is generated in the light intensity.

Therefore, there is a need for a gain equalizer capable of selectively controlling a specific wavelength of a light. This gain equalizer is essential especially for a high-speed, long-distance optical network.

A dynamic gain equalizer is proposed as a variable attenuator that equalizes the light intensity that varies according to the wavelength. The proposed dynamic gain equalizer uses the MEMS (micro electro mechanical systems) to perform dynamic gain equalization through the diffraction effect or the reflection direction. In the configuration of a MEMS where the diffraction effect is used, the micro-sized flat mirrors arranged in an array form are driven to build a square-wave-shaped irregular structure that forms a diffraction grid for dynamically controlling the light intensity. In the configuration where the reflection direction is used, the light intensity of each wavelength is dynamically controlled by changing the inclinations of micro-sized flat mirrors arranged in an array form.

FIG. 12 is a diagram showing the overview of a dynamic gain equalizer that uses the MEMS conventionally proposed.

In a dynamic gain equalizer 101, a light exiting an optical fiber 102 enters a diffraction grid 104 via a lens 103. The diffracted light diffracted by the diffraction grid 104 enters a MEMS 105 via the lens 103 for each wavelength. The MEMS 105 moves or inclines the micro-sized flat mirrors arranged in an array form to change the light intensity of the reflected light for each wavelength. The reflected light whose light intensity is changed by the MEMS 105 for each wavelength returns to the optical fiber 102 via the lens 103 and the diffraction grid 104. The MEMS 105, which controls the light intensity of the reflected light according to the wavelength dependence of the optical fiber or the gain medium, smoothes the wavelength dependence of the light intensity of the light that is returned to the optical fiber 102.

The dynamic gain equalizer, which uses an MEMS, requires as many MEMS-based micro-sized flat mirrors as there are wavelengths to be controlled and requires a resolution approximately equal to that of the light diffracted by the diffraction grid and the lens. A problem is that the mechanism becomes complicated in order to satisfy those requirements. Another problem is that a mechanical moving part sometimes causes a sticking that prevents the mirrors from being moved smoothly. These problems generate a problem in controllability and reliability.

A MEMS has no exit of light other than the optical path formed by the reflection of the micro-sized flat mirrors. A problem with the amount of light that remains after the light intensity is controlled by the MEMES (difference between incoming light and outgoing light) is that the light scatters in the MEMS and becomes noises or is that the light is converted to heat that increases the internal temperature. The problem of this scattered light or heat generation is serious when the dynamic gain equalizer is miniaturized or the optical signal capacity is increased.

To smooth the wavelength dependence of light intensity in a dynamic gain equalizer, it is required to monitor a change in the wavelength dependence of light intensity and, if a change is detected, to control the dynamic gain equalizer in order to compensate for that change. To monitor a change in the wavelength dependence of light intensity in a conventional dynamic gain equalizer that uses the MEMS, it is required to provide an optical spectrum analyzer with the same configuration as that of the dynamic gain equalizer outside the dynamic gain equalizer and to introduce a light branched from the light, which enters the dynamic gain equalizer, into the optical spectrum analyzer for use in measurement. One example of the optical spectrum analyzer has a configuration in which a photodiode array is provided instead of the MEMS.

This optical spectrum analyzer, though built in the same configuration as that of the dynamic gain equalizer, cannot share the configuration with the dynamic gain equalizer. Therefore, two configurations each with the configuration of the dynamic gain equalizer are required and, as a result, the device becomes large. In addition, the dynamic gain equalizer receives the light from which part of the light is branched off to the optical spectrum analyzer. Another problem here is that the light intensity of the light exiting from the dynamic gain equalizer is reduced by the amount of light branched off to the optical spectrum analyzer.

In view of the foregoing, it is an object of the present invention to solve the conventional problems, to provide a dynamic gain equalizer capable of selectively controlling specific wavelengths and equalizing the optical intensity for each wavelength without using a mechanism that has a mechanical moving part such as the MEMS, and thereby to increase controllability and reliability. It is another object of the present invention to solve the problem of light scattering or heat generation, which is caused by a remaining light, by compensating for it and to eliminate the need for providing an optical spectrum analyzer separately required for monitoring a light and the need for branching off the light for monitoring.

DISCLOSURE OF THE INVENTION

A dynamic gain equalizer according to the present invention selectively controls the light intensities of specific wavelengths of a light and, if the gain of the gain medium that amplifies the light changes according to the wavelength, can be used to compensate for the wavelength dependence of the gain. The dynamic gain equalizer according to the present invention, which changes the light intensity of each wavelength using a liquid crystal optical switch, has a configuration that eliminates the need for mechanical elements such as a MEMS for driving micro-sized flat mirrors arranged in an array form. The elimination of this mechanical element increases controllability and reliability.

The dynamic gain equalizer according to the present invention allows the light, which remains in the liquid crystal optical switch after the compensation that is made by changing the light intensity, to exit from the liquid crystal optical switch. This eliminates the optical components that remain in the liquid crystal optical switch, thus preventing light scattering or heat generation in the liquid crystal optical switch.

The dynamic gain equalizer according to the present invention allows the light, which remains after the compensation using the liquid crystal optical switch, to exit from the liquid crystal optical switch. The light intensity of the light can be monitored by detecting the light that exits from the liquid crystal optical switch. In general, when the incoming light is branched for monitoring the light intensity, the light intensity of the intended light is reduced. By contrast, the dynamic gain equalizer according to the present invention uses the light, which remains after compensation, for monitoring. Therefore, the dynamic gain equalizer eliminates the need for branching the incoming light and prevents a reduction in the light intensity that is caused by branching the incoming light.

The dynamic gain equalizer according to the present invention comprises a spectroscope that separates an incoming light from an input end into spectral components; a liquid crystal optical switch that receives the spectral components separated by the spectroscope; and a lens system arranged between the incoming end and the spectroscope and/or between the spectroscope and the liquid crystal optical switch. The liquid crystal optical switch changes the light intensities of the incoming spectral components for each wavelength and sends them out. This operation selectively changes the intensities of specific wavelengths of the light. It is possible that the incoming light enters from an optical fiber and the outgoing light exits to an optical fiber. In this case, the dynamic gain equalizer and the optical fiber are connected via a collimator.

The liquid crystal optical switch can comprise a plurality of liquid crystal optical switch elements. The liquid crystal optical switch elements can be arranged in one dimension or in two dimensions.

A first arrangement mode is a one-dimensional arrangement in which the liquid crystal optical switch elements are linearly arranged along the optical components separated by the spectroscope. This one-dimensional arrangement can change the light intensities of the optical components, separated by the spectroscope, for each wavelength.

A second arrangement mode of liquid crystal optical switch elements is a two-dimensional arrangement in which the liquid crystal optical switch elements are arranged in the line direction along which the optical components separated by the spectroscope are arranged and in the direction a right angle to the line direction. This two-dimensional arrangement changes the light intensities of the optical components, separated by the spectroscope, for each wavelength based on the arrangement in the line direction and, at the same time, changes the light intensities for each wavelength more finely based on the arrangement in the direction at a right angle to the line direction.

A liquid crystal optical switch element used in the present invention has two outgoing modes according to the direction in which the light is sent.

A first outgoing mode is a retro-reflective mode in which the light, whose intensity is changed, is reflected and sent out into the incoming direction. In the retro-reflective mode, the light whose intensity is changed and which is compensated can be returned in the same direction as that of the incoming light.

A second outgoing mode is a through mode in which the light, whose intensity is changed, is output into a direction different from the incoming direction. In the transmissive type mode, the light whose intensity is changed and which is compensated can be output into a direction different from that of the incoming light and therefore it is easy to separate the outgoing light from the incoming light.

In addition, the liquid crystal optical switch used in the dynamic gain equalizer according to the present invention may have many modes.

In a first configuration mode, an optical element in which a liquid crystal cell and a light reflector are combined is provided on two sides that are at a right angle to a polarizing beam splitter and another side of the polarizing beam splitter is used as the incoming end and the reflection end of the light.

In a second configuration mode, the liquid crystal optical switch element comprises a polarizing beam splitter, at least two light reflectors, and a liquid crystal cell that controls a polarization direction, and the polarizing beam splitter and the light reflectors are arranged so that two polarization components, separated by the polarizing beam splitter, travel along the same optical path but into different traveling directions, re-enter the polarizing beam splitter, and are combined therein and, at the same time, the liquid crystal cell is arranged in the optical path.

In the first and second configuration modes, the optical intensity is changed by controlling the polarization direction of the polarization components using a liquid crystal cell. The polarization direction of the polarization components of a liquid crystal cell can have one of two control modes.

In a first control mode, the liquid crystal cell is controlled by using one of two angular positions, 0-degree rotation and 90-degree rotation, or any angular position for the azimuthal angle of an incoming linearly polarized light. Controlling the liquid crystal cell using one of two angular positions, 0-degree rotation and 90-degree rotation, turns on or off the outgoing light and thereby changes the light intensity.

In a second control mode, the liquid crystal cell is controlled by using any angular position for the azimuthal angle of an incoming linearly polarized light. Controlling the liquid crystal cell using any angular position controls the light intensity of the outgoing light in an intermediate state and thereby allows the liquid crystal cell to be used as a variable attenuator for changing the light intensity.

In addition, the dynamic gain equalizer according to the present invention may have a configuration for monitoring the light intensity. In this configuration that has a monitor, a photo detection element is provided on the liquid crystal optical switch so that the light intensity of the remaining light of the outgoing light, whose light intensity is changed, is detected. This configuration allows the photo detection element to act as an optical spectrum analyzer that detects the light intensity complementary to the light intensity of the outgoing light for each wavelength. More specifically, a photodiode array, which detects the light intensity, is provided for the liquid crystal optical switch elements at one end of the outgoing ends of the polarizing beam splitter. This photodiode array configures the optical spectrum analyzer for detecting the light intensity of the outgoing light and the light intensity complementary to the light intensity of the outgoing light for each wavelength.

The dynamic gain equalizer according to the present invention controls the liquid crystal optical switch elements based on the detection output of the optical spectrum analyzer. The light intensity detected by the optical spectrum analyzer according to the present invention is complementary to the light intensity of the light output from the liquid crystal optical switch elements. For example, the optical spectrum analyzer controls the liquid crystal optical switch elements so that the light intensity of the outgoing light becomes a predetermined intensity, based on the light intensity detected by the optical spectrum analyzer.

BEST MODE FOR CARRYING OUT THE INVENTION

Preferred embodiments of the present invention will be described in detail below with reference to the drawings.

Figure 1:
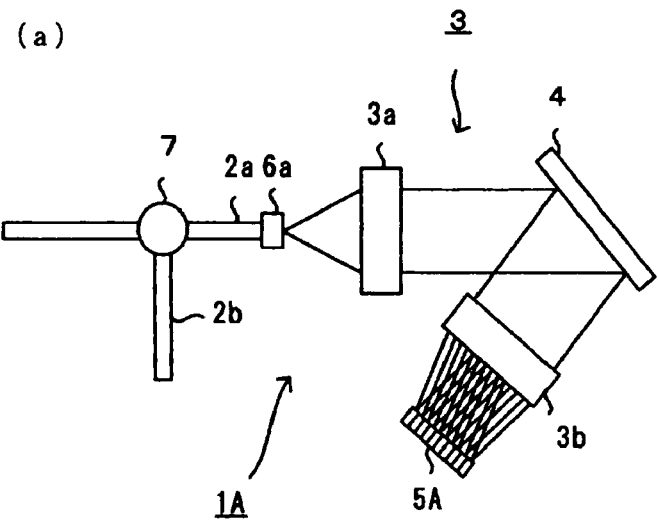
FIG. 1 is a diagram showing the general configuration of a dynamic gain equalizer according to the present invention.
Figure 1:
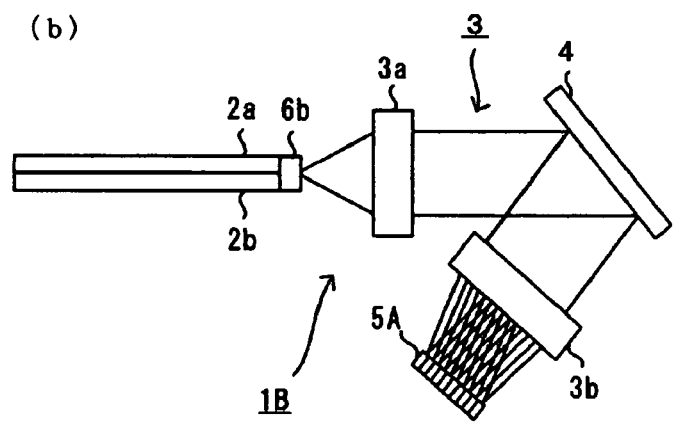
Figure 1:
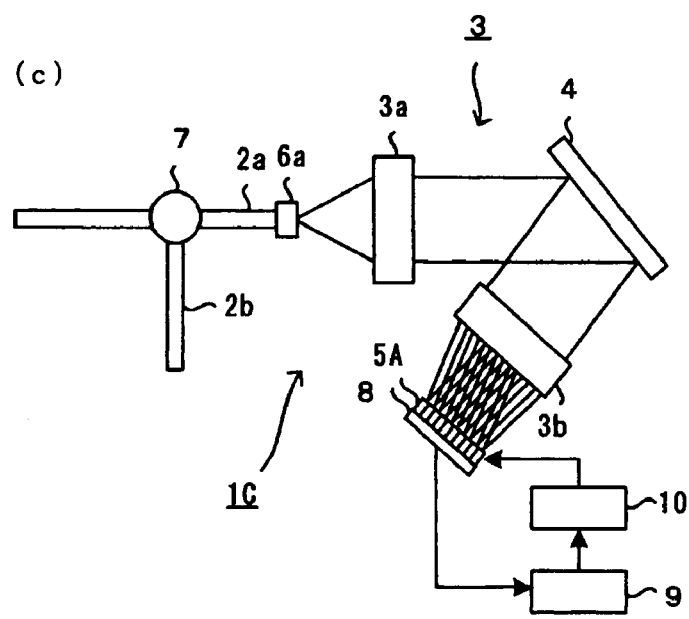

FIG. 1 is a diagram showing the general configuration of a dynamic gain equalizer according to the present invention. The example of the configuration shown in FIG. 1 shows a retroreflective type that sends out a light by reflecting a light, whose light intensity has been changed, in the incoming direction. FIG. 1(a) and FIG. 1(b) are examples of a dynamic gain equalizer with no light intensity monitor function, and FIG. 1(c) is an example of a dynamic gain equalizer with the light intensity monitor function.

In the example of the configuration shown in FIG. 1(a), a dynamic gain equalizer 1A according to the present invention comprises a spectroscope 4 that separates an incoming light into specific wavelengths, a liquid crystal optical switch 5A that receives the spectral components separated by the spectroscope 4, and optical elements 3 (lenses 3a, 3b) arranged between the incoming end and the spectroscope 4 and between the spectroscope 4 and the liquid crystal optical switch 5A.

An incoming light can enter from an optical fiber 2a. The light passing through the optical fiber 2a is introduced into the spectroscope 4 via a collimator 6a connected to the end of the optical fiber 2a through the lens 3a. The optical components separated by the spectroscope 4 into the optical signals of the wavelengths are introduced into the liquid crystal optical switch 5A through the lens 3b.

The liquid crystal optical switch 5A of retroreflective type changes the light intensity of the introduced wavelength components and reflects the light whose intensity is changed. The light reflected by the liquid crystal optical switch 5A travels along the optical path in reverse order via the lens 3b, the spectroscope 4, the lens 3a, the collimator 6a, and then back to the optical fiber 2a. The liquid crystal optical switch 5A can set the light intensity of the light, which will be returned to the optical fiber 2a, to predetermined wavelength characteristics by changing the light intensities of the wavelength components.

For example, when the light entering from the optical fiber 2a changes because the gain of the gain medium, which amplifies the light, changes according to the wavelength, the liquid crystal optical switch 5A changes the intensity of the received light so that the wavelength dependence of this gain is compensated for and then sends out the light. When a 1-core collimator 6a is connected to the optical fiber 2a, a circulator 7 separates the light from the dynamic gain equalizer 1A and then sends it to an optical fiber 2b.

FIG. 1(b) shows an example of the configuration in which a 2-core collimator 6b is used. The configuration in this example eliminates the need for the circulator 7 provided in the configuration shown in FIG. 1(a) and uses a 2-core collimator 6b instead of the 1-core collimator 6a in FIG. (a). This configuration causes the incoming light from the optical fiber 2a to be supplied to a dynamic gain equalizer 1B via the 2-core collimator 6b. The light whose intensity is changed by the dynamic gain equalizer 1B is sent from the 2-core collimator 6b directly to the optical fiber 2b not via the circulator 7.

FIG. 1(c) shows an example of the configuration in which a light intensity monitor function is provided to control the liquid crystal optical switch 5A using the monitored light intensity. Although FIG. 1(c) shows a case in which the monitor function is applied to the configuration where the circulator 7 and the 1-core collimator 6a in FIG. 1(a) are used, the monitor function may be applied also to the example of the configuration in FIG. 1(b) where the 2-core collimator 6b is used.

In FIG. 1(c), the liquid crystal optical switch 5A has a light intensity detector such as a photodiode array (PDA) 8. The liquid crystal optical switch 5A reflects part of the incoming light and returns it to the incoming light side and, at the same time, introduces the remaining incoming light into a direction different from the reflection direction. The photodiode array 8 captures the incoming light other than the reflected light to detect the light intensities of the optical signals of the wavelengths.

A monitor unit 9 monitors the signals detected by the photodiode array 8. Control means 10 controls the liquid crystal optical switch 5A based on the monitor output. The monitor output may also be displayed on a display unit not shown. It is also possible not to provide the control means 10 but to display only the monitor output. The optical fibers 2a and 2b are single-mode fibers.

Figure 2:
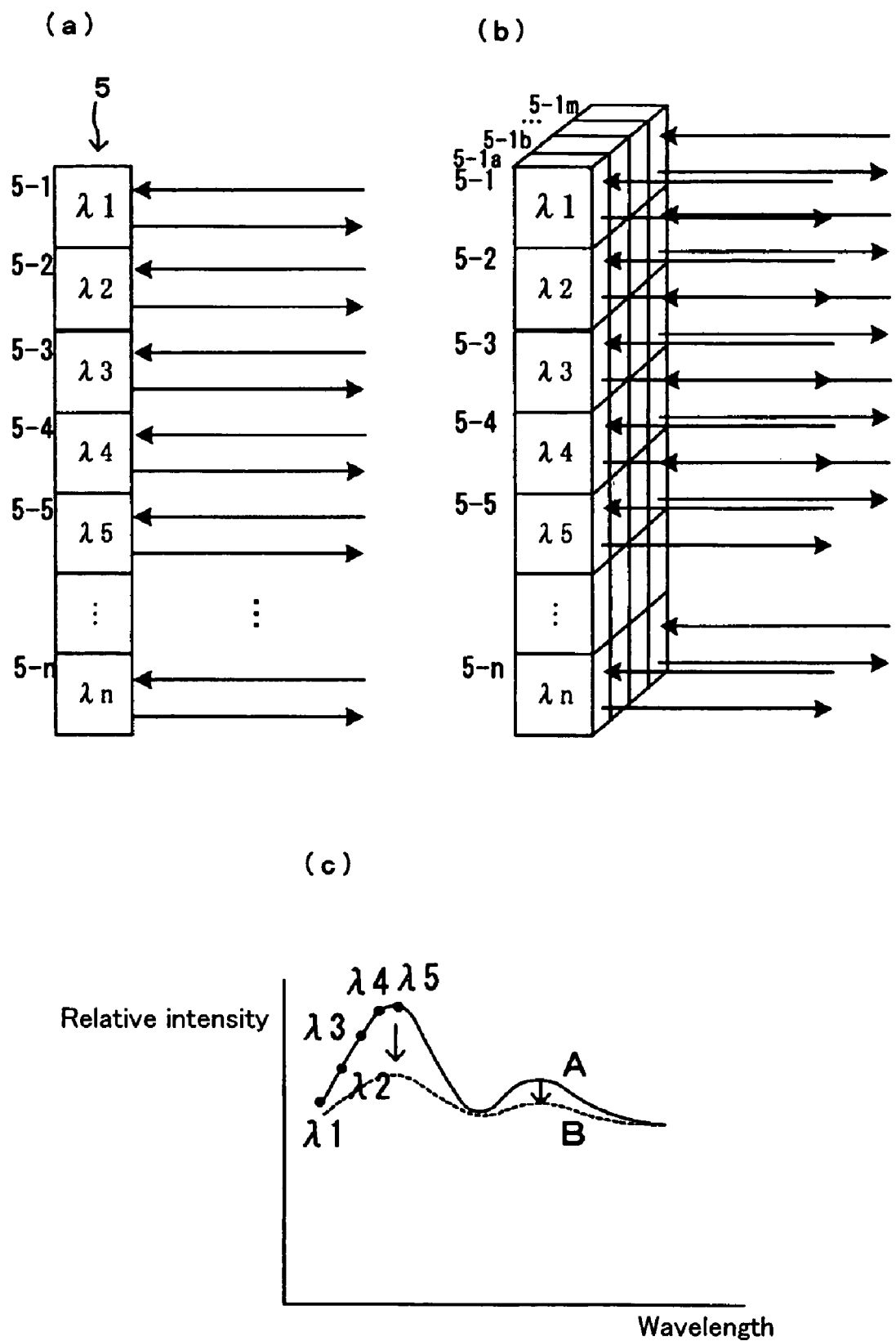
FIG. 2 is a diagram showing the configuration of a liquid crystal optical switch and the control of optical waveform characteristics by the liquid crystal optical switch.

Next, with reference to FIG. 2, the configuration of the liquid crystal optical switch and the control of the wavelength characteristics by the liquid crystal optical switch will be described. The liquid crystal optical switch can be applied both to a retroreflective type optical switch that reflects the outgoing light into the direction of the incoming light and to a transmissive type optical switch that introduces the outgoing light into a direction different from that of the incoming light.

FIG. 2(a) shows the one-dimensional arrangement of a plurality of liquid crystal optical switch elements constituting a liquid crystal optical switch. The plurality of liquid crystal optical switch elements 5-1, 5-2, 5-3, . . . , 5-n are linearly arranged along the spectral components separated by the spectroscope with the elements corresponding to the wavelengths $\lambda 1, \lambda 2, \lambda 3, \ldots, \lambda n$. In this configuration, the liquid crystal optical switch elements 5-1, 5-2, 5-3, . . . , 5-n change the light intensities of the optical signals of the wavelengths $\lambda 1, \lambda 2, \lambda 3, \ldots, \lambda n$.

Similarly, FIG. 2(b) shows the two-dimensional arrangement of a plurality of liquid crystal optical switch elements constituting a liquid crystal optical switch. A plurality of liquid crystal optical switch elements 5-1a, 5-1b, 5-1c, . . . , 5-1m, 5-2a, 5-2b, 5-2c, . . . , 5-2m, 5-na, 5-nb, 5-nc, . . . , 5-nm are arranged in the line direction of the spectral components separated by the spectroscope and in the direction at a right angle to this line direction. For example, the liquid crystal optical switch elements 5-1a, 5-1b, 5-1c, . . . , 5-1m are made to correspond to the wavelength $\lambda 1$, and the liquid crystal optical switch elements 5-2a, 5-2b, 5-2c, . . . , 5-2m are made to correspond to the wavelength $\lambda 2$. This applies also to the other liquid crystal optical switch elements.

This two-dimensional arrangement changes the light intensities of the optical signal components corresponding to the same wavelength using the plurality of liquid crystal optical switch elements, allowing the light intensity of an optical signal of a specific wavelength to be changed more finely.

FIG. 2(c) shows a general example of the light intensities (solid line A in the figure) of a light that enters the liquid crystal optical switch elements and the light intensities (broken line B in the figure) of the light that exits after the light intensities are changed.

As indicated by solid line A in FIG. 2(c), the gain varies according to the wavelength because the intensity characteristics depend on the wavelength dependence of the gain of the gain medium. The liquid crystal optical switch elements arranged corresponding to the wavelengths decrease the optical intensities of the optical signals of the wavelengths and give the intensity characteristics such as those indicated by broken line B in FIG. 2(c). For the intensity characteristics, the light intensities are almost equal among the optical intensities of all the wavelengths. What wavelength characteristics are to be used can be determined as required.

Figure 3:
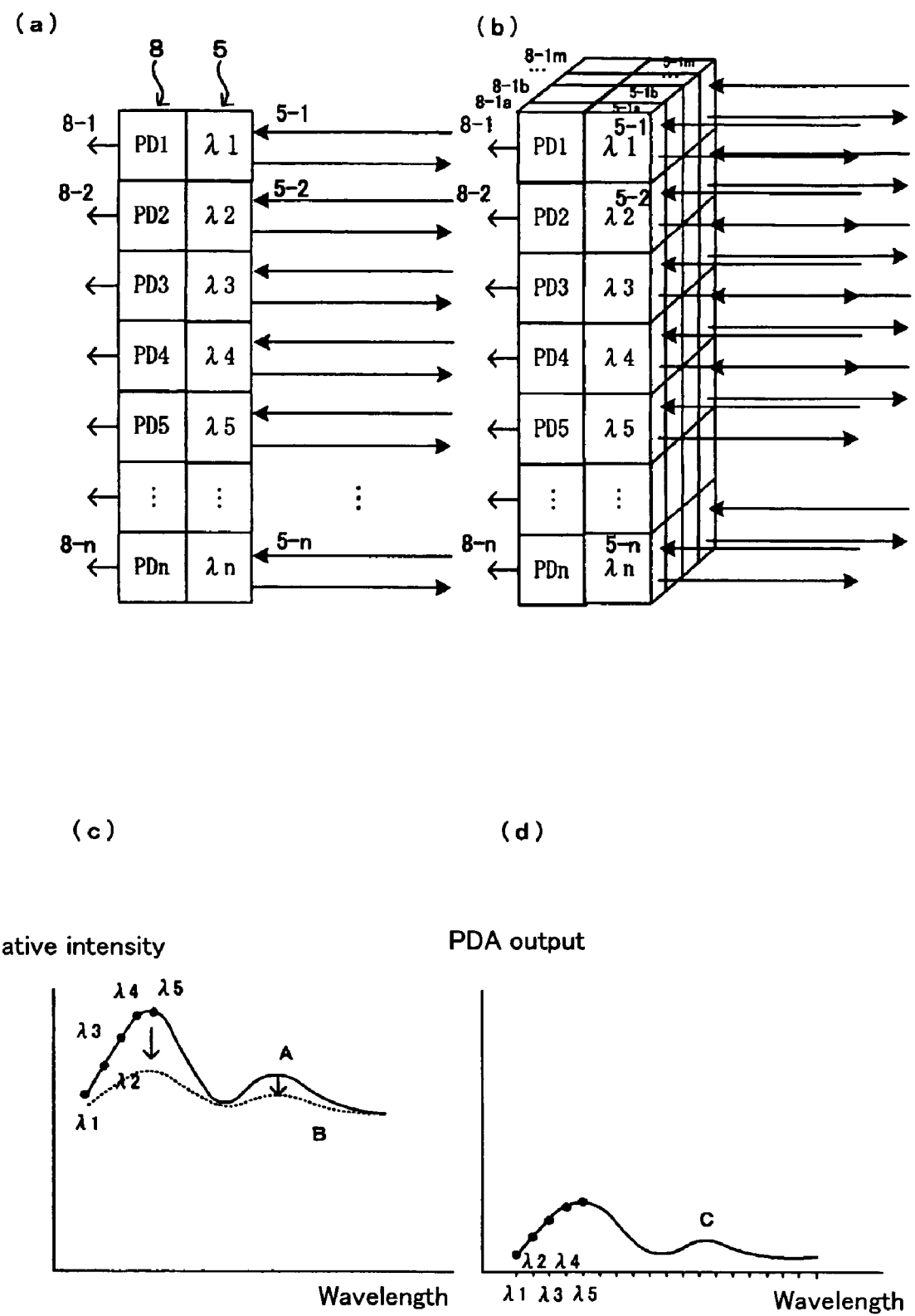
FIG. 3 is a diagram showing the configuration of a liquid crystal optical switch having a photodiode array and the control of optical wavelength characteristics by the liquid crystal optical switch.

Next, the configuration of a liquid crystal optical switch with a photodiode array and the control of the optical wavelength characteristics by this liquid crystal optical switch will be described with reference to FIG. 3. The configuration and the control described below can be applied to any type of liquid crystal optical switch, that is, the retroreflective type optical switch that reflects the outgoing light into the same direction as that of the incoming light or the transmissive type optical switch that introduces the outgoing light into a direction different from that of the incoming light.

FIG. 3(a) shows the one-dimensional arrangement of a plurality of liquid crystal optical switch elements constituting a liquid crystal optical switch. This liquid crystal optical switch is a one-dimensional liquid crystal optical switch with the configuration similar to that shown in FIG. 2 to which the photodiode array 8 is added. The photodiode array 8 is provided at one output end of the liquid crystal optical switch elements.

A plurality of liquid crystal optical switch elements 5-1, 5-2, 5-3, . . . , 5-n are arranged along the line to which the spectroscope 4 outputs the separated optical components, and photodiode arrays 8-1, 8-2, 8-3, . . . , 8-n are provided next to the liquid crystal optical switch elements. The photodiode arrays 8-1, 8-2, 8-3, . . . , 8-n detect the light intensities of the light that remains after the liquid crystal optical switch elements 5-1, 5-2, 5-3, . . . , 5-n change the light intensities and reflect the light for the wavelengths $\lambda 1, \lambda 2, \lambda 3, \ldots, \lambda n$.

Similarly, FIG. 3(b) shows the two-dimensional arrangement of a plurality of liquid crystal optical switch elements, which constitute a liquid crystal optical switch, and the photodiode arrays. The liquid crystal optical switch is a two-dimensional liquid crystal optical switch with the configuration similar to that shown in FIG. 2 to which the photodiode array 8 is added. The photodiode array 8 is provided at one output end of the liquid crystal optical switch.

A plurality of liquid crystal optical switch elements 5-1a, 5-1b, 5-1c, . . . , 5-1m, 5-2a, 5-2b, 5-2c, 5-2m, 5-na, 5-nb, 5-nc, . . . , 5-nm are arranged along the line to which the spectroscope 4 outputs the separated optical components and along the direction at a right angle to this line, and photodiode arrays 8-1a, 8-1b, 8-1c, . . . , 8-1-m, . . . , 8-2a, 8-2b, 8-2c, . . . , 8-2m, 8-na, 8-nb, 8-nc, . . . , 8-nm are provided next to the liquid crystal optical switch elements. For the wavelengths λ1, λ2, λ3, . . . , λn, the photodiode arrays 8-1a, 8-1b, 8-1c, . . . , 8-1m, . . . , 8-na, 8-nb, 8-nc, . . . , 8-nm detect the light intensities of the light that remains after the liquid crystal optical switch elements 5-1a, 5-1b, 5-1c, . . . , 5-1m, . . . , 5-na, 5-nb, 5-nc, . . . , 5-nm change the light intensities and reflect the light.

For example, when liquid crystal optical switch elements 5-1a, 5-1b, 5-1c, . . . , 5-1m are made to correspond to λ1, the photodiode arrays 81-a, 8-1b, 8-1c, . . . , 8-1m detect the light intensities of the light that remains after the liquid crystal optical switch elements 5-1a, 5-1b, 5-1c, . . . , 5-1m change the light intensity of the light of the wavelength λ1. This applies also to the other liquid crystal optical switch elements.

This two-dimensional arrangement detects, for each wavelength, the intensity of a light corresponding to the same wavelength using a plurality of photodiode arrays, thus making it possible to detect and change the intensity of the light of each wavelength more finely.

As in FIG. 2(c), FIG. 3(c) shows a general example of the light intensities (solid line A in the figure) of a light that enters the liquid crystal optical switch elements and the light intensities (broken line B in the figure) of the light that exits after the light intensities are changed.

As indicated by solid line A in FIG. 3(c), the gain varies according to the wavelength because the gain of the gain medium depends on the wavelength dependence. By decreasing the intensities of a light of the wavelengths using the liquid crystal optical switch elements each corresponding to a specific wavelength, the intensity characteristics can be made almost equal among the wavelengths as indicated by broken line B in FIG. 3(c). What wavelength characteristics are to be used can be determined as required.

FIG. 3(d) shows an example of the output of the photodiode array. The detection output of the photodiode array, which is the intensities of the light that remains after the liquid crystal optical switch changes the light intensities and sends out the light, corresponds to the difference between solid line A and broken line B in FIG. 3(c).

For example, if the amount of light intensity to be changed by the liquid crystal optical switch is set so that the wavelength characteristics become those indicated by broken line B in FIG. 3(c), there is no gain variation. If there is no change in the light intensity of the incoming light, the output of the photodiode array is the characteristics shown in FIG. 3(d). Conversely, if the output characteristics of the photodiode array are shifted from those shown in FIG. 3(d), it indicates that the light intensity of the incoming light has changed. At this time, to adjust the waveform characteristics of the light to the specified characteristics, it is necessary to control the change in the light intensities by the liquid crystal optical switch so that the output characteristics of the photodiode array become the characteristics specified at the setting time.

Next, two configuration modes of the liquid crystal optical switch elements used in the liquid crystal optical switch according to the present invention will be described.

Figure 4:
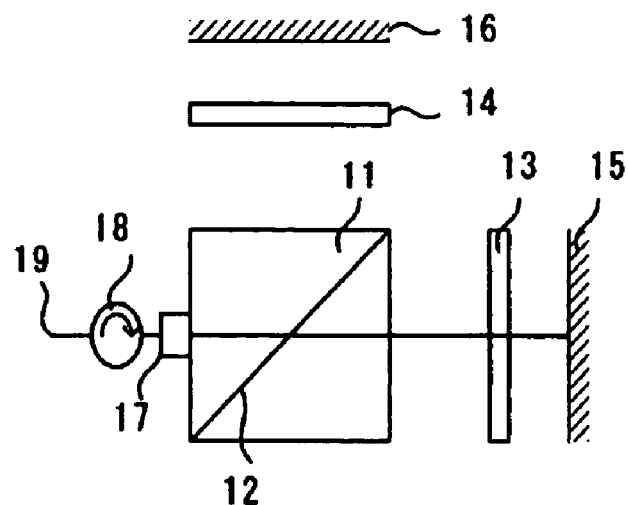
FIG. 4 is a diagram showing a first configuration mode of a liquid crystal optical switch element used in the present invention.
Figure 4:
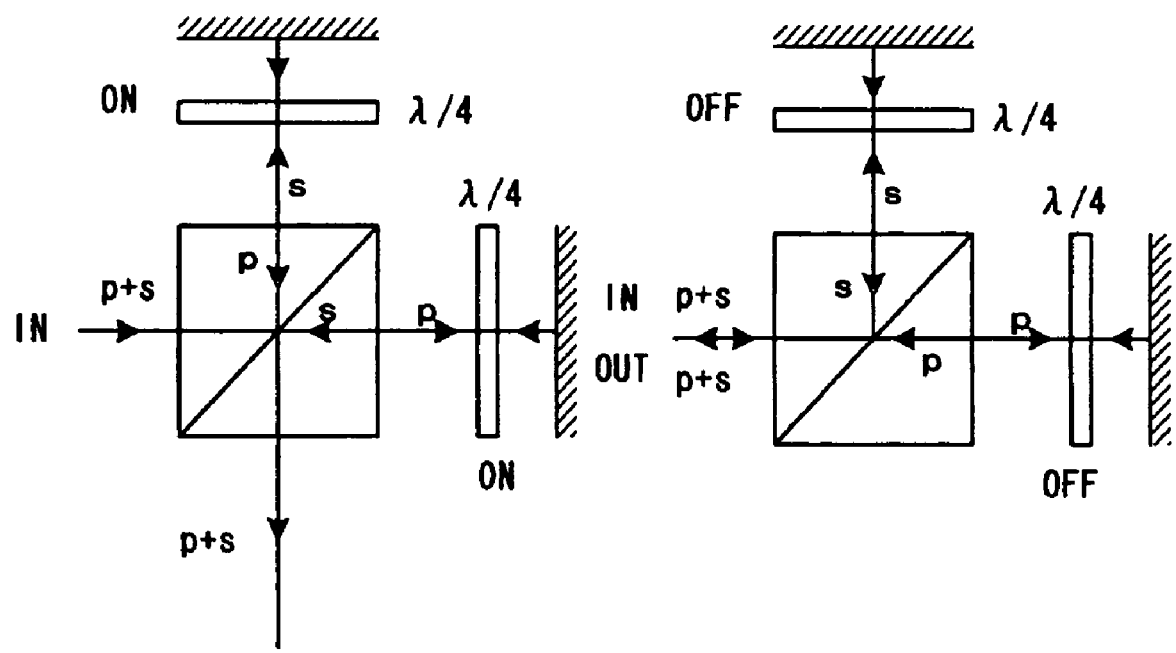

In the first configuration mode, optical elements, each composed of a liquid crystal cell and a light reflector, are provided on any two sides that are at a right angle to a polarizing beam splitter, and one of the other sides of the polarizing beam splitter is used the incoming end and the outgoing end of the light. The following describes the first configuration mode with reference to FIG. 4.

Referring to FIG. 4(a), a liquid crystal optical switch 5 has two optical elements, one is an optical element composed of a liquid crystal cell 13 and a light reflector 15 and the other is an optical element composed of a liquid crystal cell 14 and a light reflector 16, on the two sides that are at a right angle to a polarizing beam splitter 11. The side opposed to the liquid crystal cell 13 across the polarizing beam splitter 11 is the incoming end and the outgoing end, and an optical fiber 19 is connected to this side via a collimator 17. On the other hand, the side opposed to the liquid crystal cell 14 across the polarizing beam splitter 11 is the outgoing end of the light that remains after the light intensities are changed. The monitor can be connected to the optical fiber via a collimator not shown or can be configured by arranging a photodiode array.

Because the side to which the optical fiber 19 is connected is both the incoming end and the outgoing end, a circulator 18 is connected to separate the light into the incoming light and the outgoing light. A voltage is applied to the liquid crystal cells 13 and 14 to change the polarization state of an incoming light by λ/4 wavelength. In this configuration, each crystal cell is combined with a light reflector to change the polarization state by λ/2 wavelength by adding up the changes in the polarization state of both an incoming light and an outgoing light. The polarizing beam splitter 11 has a polarized light separation/combination film 12.

The liquid crystal optical switch in this configuration can perform two types of switching operation states: exchanging state in which a light is not output to the incoming end side and the straight state in which a light is output to the incoming end.

FIG. 4(b) is a diagram showing the exchanging state. In this operation state, no voltage is applied to the liquid crystal cell 13 and the liquid crystal cell 14. A light entering from the optical fiber 19 is composed of two polarization components p and s whose polarization planes are at a right angle. After changed to parallel beams by the collimator 17, the incoming light enters the polarizing beam splitter 11 where it is separated by the polarized light separation/combination film 12 into the polarization component p that goes straight and the polarization component s that reflects.

When no voltage is applied to the liquid crystal cell 13 and the liquid crystal cell 14, the polarization state is changed by the liquid crystal cell 13 and the liquid crystal cell 14. In FIG. 4(b), ON indicates that the polarization state is changed. The polarization component p, which goes straight, passes through the liquid crystal cell 13 where the polarization state is changed by λ/4 wavelength, is reflected by the light reflector 15, and passes through the liquid crystal cell 13 again. At this time, the polarization state is further changed by λ/4 wavelength. Because of this, the incoming polarization component p is changed to the polarization components. The changed polarization component s is reflected by the polarized light separation/combination film 12 and is output from the end different from the incoming end. On the other hand, the polarization component s that is reflected by the polarized light separation/combination film 12 passes through the liquid crystal cell 14 where the polarization state is changed by λ/4 wavelength, is reflected by the light reflector 16, and passes through the liquid crystal cell 14 again. At this time, the polarization state is further changed by λ/4 wavelength. Because of this, the incoming polarization component s is changed to the polarization component p. The changed polarization component p passes through the polarized light separation/combination film 12 and is output from the end different from the incoming end. In this way, the incoming light exits from the end different from the incoming end.

FIG. 4(c) is a diagram showing the straight state. In this operation state, a voltage is applied to the liquid crystal cell 13 and the liquid crystal cell 14. When a voltage is applied to the liquid crystal cell 13 and the liquid crystal cell 14, the liquid crystal cell 13 and the liquid crystal cell 14 do not change the polarization state. In FIG. 4(c), OFF indicates that the polarization state is not changed.

The polarization component p, which goes straight, passes through the liquid crystal cell 13 with the polarization state unchanged, is reflected by the light reflector 15, and passes through the liquid crystal cell 13 again with the polarization state unchanged. After reflected, the polarization component p passes through the liquid crystal cell 13, goes straight through the polarized light separation/combination film 12, and is output to the optical fiber 19 via the collimator 17. On the other hand, the polarization component s, which is reflected by the polarized light separation/combination film 12, passes through the liquid crystal cell 14 with the polarization state unchanged and, after that, is reflected by the light reflector 16 and passes through the liquid crystal cell 14 again with the polarization state unchanged. After reflected, the polarization component s that passes through the liquid crystal cell 14 is reflected by the polarized light separation/combination film 12 and is output to the optical fiber 19 via the collimator 17. This causes the incoming light to be output from the end that is the same as the incoming end.

The configuration of a 2×2 optical changeover switch having the configuration similar to that of the liquid crystal optical switch described above and the configuration of an add drop multiplexer using the 2×2 optical changeover switch are described, for example, in Optical Engineering, Vol. 40 No. 8, 1521-1528, August 2001 (Sarun Sumriddetchakajorn, Nabeel A. Riza, Deepak K. Sengupta).

In the second configuration mode, a liquid crystal optical switch element comprises a polarizing beam splitter, at least two light reflectors, and liquid crystal cells for controlling the polarization direction. The polarizing beam splitter and the light reflectors are arranged so that two polarization components, separated by the polarizing beam splitter, travel along the same optical path but into different traveling directions, re-enter the polarizing beam splitter, and are combined therein. At the same time, the liquid crystal cells are placed in the optical path.

Figure 5:
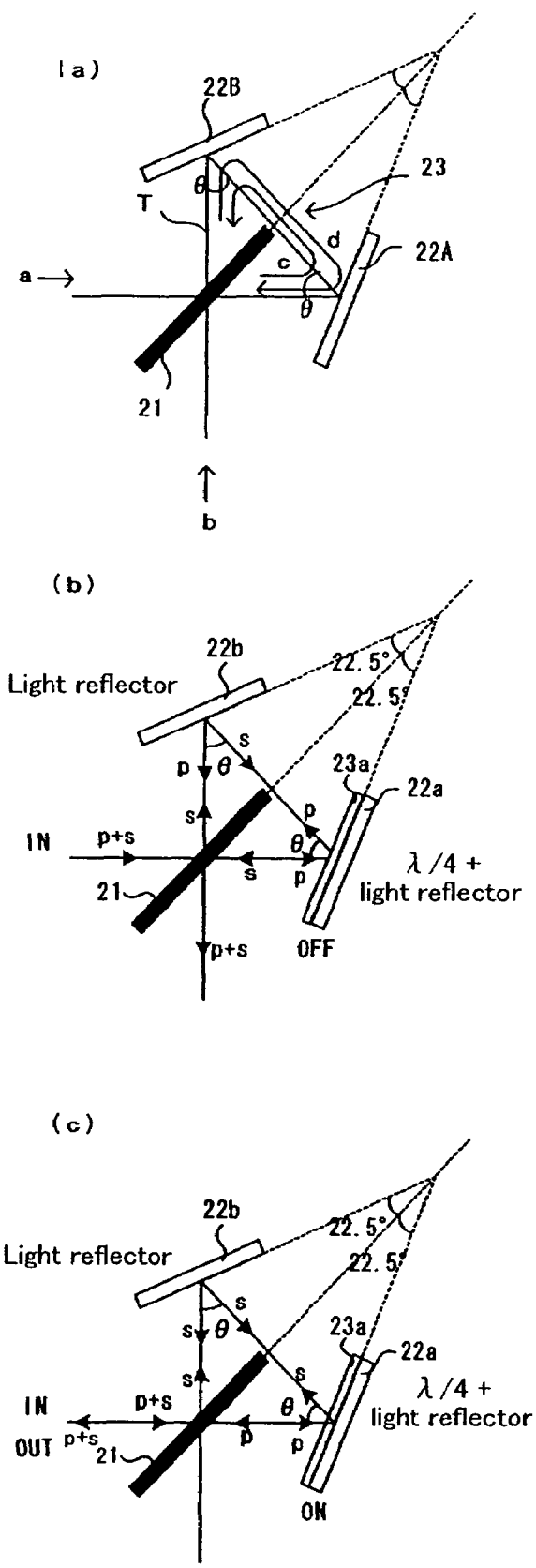
FIG. 5 is a diagram showing a second configuration mode of a liquid crystal optical switch element used in the present invention.

The following describes the second configuration mode with reference to FIG. 5.

Referring to FIG. 5, the liquid crystal optical switch 5 comprises polarized light separation/combination means 21, at least two reflection means 22, and polarization control means 23 for controlling the polarization direction. The polarized light separation/combination means 21, which separates an incoming light into the p-polarization component and the s-polarization component, allows the p-polarization component to go straight and reflects the s-polarization component.

The reflection means 22 (22A and 22B) are arranged so that the two polarization components, separated by the polarized light separation/combination means 21, go along the same optical path but in different directions and re-enter the polarized light separation/combination means 21. The triangle indicated by T in the figure indicates an optical path formed by the polarized light separation/combination means 21 and the reflection means 22 and 23. For a light entering from the direction indicated by a in the figure, two paths are formed; path c along which the light goes straight through the polarized light separation/combination means 21, is reflected by the reflection means 22A and the reflection means 22B in this order, and then returns to the polarized light separation/combination means 21; and path d along which the light is reflected by the polarized light separation/combination means 21, is reflected by the reflection means 22B and the reflection means 22A in this order, and then returns to the polarized light separation/combination means 21. The two paths c and d are the same optical path. For a light entering from the direction indicated by b in the figure, two paths c and d are the same optical path because the polarized light separation/combination means 21 and reflection means 22A and 22B are optically symmetrical.

The polarization control means 23, which controls the polarization state, is arranged in this optical path. The polarization control means 23 may be arranged in one of many positions in the optical path.

This configuration allows different paths to have an equal path length and allows those paths to use the same optical elements in the optical path, such as reflection means and polarization control means, through which a light passes.

The polarized light separation/combination means 21 can be formed by a polarized light separation/combination film. The polarization control means 23 can be formed by a liquid crystal cell.

An example of the configuration based on the second configuration mode described above and the operation state in that configuration example will be described with reference to FIGS. 5(b) and 5(c).

In the configuration example, the two light reflectors 22A and 22B are arranged in positions that are symmetrical with respect to the polarized light separation/combination means 21 so that the incoming angle and the outgoing angle of the polarization components become 22.5 degrees. In the figure, the incoming angle and the outgoing angle are indicated by θ. In this configuration example, polarization control means 23a, which performs polarization control of λ/4 wavelength, is placed in the optical path of one of light reflectors 22a and 22b that is in front of the light reflector (although placed in front of the light reflector 22a in the figure, the polarization control means may also be placed in front of the light reflector 22b).

FIG. 5(b) is a diagram showing the operation corresponding to the exchanging state described above. In this operation state, the polarization control means does not change polarization. When a liquid crystal cell is used as the polarization control means, a voltage is applied to the liquid crystal cell to put the optical switch in this operation state. In the figure, this operation state is indicated by OFF.

The light entering from the incoming end (IN in the figure) is composed of two polarization components, p and s, whose polarization planes are at a right angle. The incoming light is changed to parallel beams by a collimator not shown and is separated by the polarized light separation/combination means 21 into the polarization component p that goes straight and the polarization component s that reflects.

Because the polarization control means 23a does not change polarization in this operation state, the polarization component p that goes straight passes through the polarization control means 23a with the polarization state unchanged and, after that, the polarization component is reflected by the light reflector 22a and passes through the polarization control means 23a again. At this time, the polarization state does not change but the polarization component is still the polarization component p. The polarization component p is further reflected by the light reflector 22b and reaches the polarized light separation/combination means 21 again. At this time, the polarization component p travels in the direction at a right angle to the incoming direction. This polarization component p goes straight through the polarized light separation/combination means 21 and exits from the end different from the incoming end.

On the other hand, the polarization component s that reflects on the polarized light separation/combination means 21 is reflected by the light reflector 22b. After passing through the polarization control means 23a with the polarization state unchanged, the polarization component is reflected by the light reflector 22a and passes through the polarization control means 23a again. At this time, the polarization state does not change and therefore the polarization component is still the polarization component s. The polarization component s reaches the polarized light separation/combination means 21 again and is reflected. The direction of reflection in this case is at a right angle to the incoming direction and the polarization component exits from the end different from the incoming end. This causes the incoming light to exit from the end different from the incoming end.

FIG. 5(c) is a diagram showing the operation corresponding to the straight state described above. In this operation state, the polarization control means changes polarization. When a liquid crystal cell is used as the polarization control means, a voltage is not applied to the liquid crystal cell to put the optical switch in this operation state. In the figure, this operation state is indicated by ON.

The light entering from the incoming end (IN in the figure) is changed to parallel beams by a collimator not shown and is separated by the polarized light separation/combination means 21 into the polarization component p that goes straight and the polarization component s that reflects.

The polarization control means 23a changes polarization in this operation state. The polarization component p that goes straight passes through the polarization control means 23a with the wavelength changed by $\lambda/4$. After that, the polarization component is reflected by the light reflector 22a and passes through the polarization control means 23a again with the wavelength changed by $\lambda/4$ and is changed to the polarization component s. The polarization component s is further reflected by the light reflector 22b and reaches the polarized light separation/combination means 21 again. At this time, the polarization component s travels in the direction at a right angle to the incoming direction. This polarization component s is reflected by the polarized light separation/combination means 21 and exits from the outgoing end OUT, which is the same as the incoming end, via a collimator not shown.

On the other hand, the polarization component s that reflects on the polarized light separation/combination means 21 is reflected by the light reflector 22b. Next, the polarization component passes through the polarization control means 23a with the wavelength changed by $\lambda/4$, is reflected by the light reflector 22a, passes through the polarization control means 23a again with the wavelength changed by $\lambda/4$, and is changed to the polarization component p. The polarization component p reaches the polarized light separation/combination means 21 again and goes straight through it. The traveling direction in this case is the opposite of the incoming direction, and the polarization component exits from the outgoing end OUT, which is the same as the incoming end, via a collimator not shown. This causes the incoming light to exit from the end that is the same as the incoming end.

Figure 6:
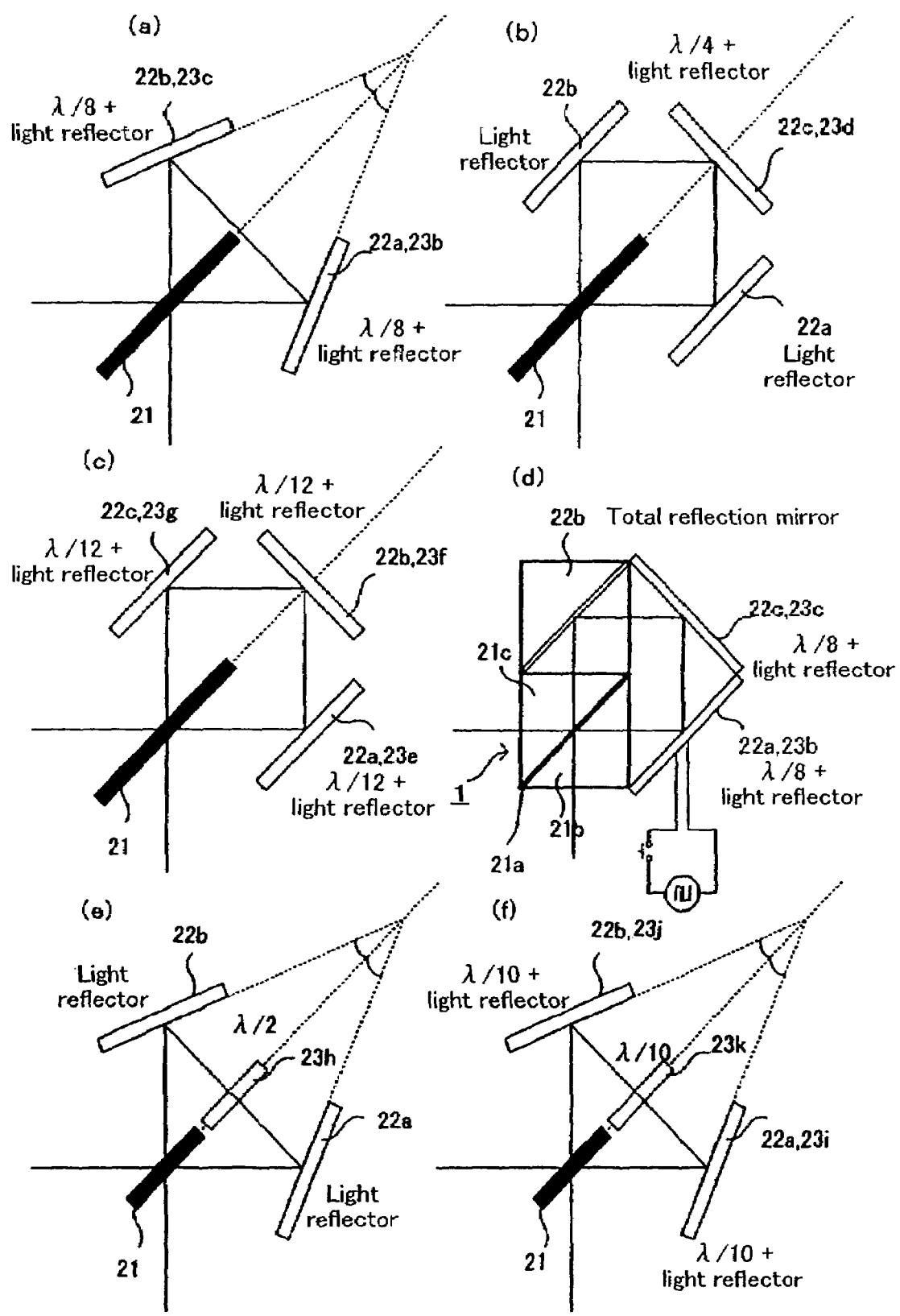
FIG. 6 is a diagram showing another second configuration mode of the liquid crystal optical switch element used in the present invention.

The configuration example based on the second configuration mode may have the configuration shown in FIG. 5 as well as the configuration shown in FIG. 6.

In the configuration example shown in FIG. 6(a), the two light reflectors 22a and 22b are arranged in positions that are symmetrical with respect to the polarized light separation/combination means 21 so that the incoming angle and the outgoing angle of the polarization components become 22.5 degrees. In the figure, the incoming angle and the outgoing angle are indicated by $\theta$. In this configuration example, polarization control means 23b and 23c, each of which performs polarization control of $\lambda/8$ wavelength, are each placed in the optical paths in front of the two light reflectors 22a and 22b.

In the configuration example shown in FIG. 6(b), two light reflectors 22a and 22b are arranged symmetrically with respect to the polarized light separation/combination means so that the incoming angle and the outgoing angle of the polarization component become 45 degrees. In addition, one light reflector 22c is arranged that is in the optical path connecting the two light reflectors 22a and 22b and that is in a direction perpendicular to the light reflectors 22a and 22b. In this configuration example, polarization control means 23d, which performs polarization control of $\lambda/4$ wavelength, is placed in the optical path in front of the light reflector 22c.

In the configuration example shown in FIG. 6(c), two light reflectors are arranged symmetrically with respect to the polarized light separation/combination means so that the incoming angle and the outgoing angle of the polarization component become 45 degrees. In addition, one light reflector is arranged that is in the optical path connecting the two light reflectors and that is in a direction perpendicular to those light reflectors. Another arrangement of the polarization control means is that the polarization control means for controlling polarization of $\lambda/12$ wavelength is placed in the optical path in front of each of three light reflectors. In this configuration example, polarization control means 23e, 23f, and 23g, which perform polarization control of $\lambda/12$ wavelength, are placed on the light reflectors 22a, 22b, and 22c.

In the configuration example shown in FIG. 6(d), three light reflectors are arranged at a right angle with each other as in the configuration examples shown in FIGS. 6(b) and 6(c). One of the light reflectors next to the polarized light separation/combination means 21 is a total reflection mirror such as a prism, and the polarization control means for performing polarization control of $\lambda/8$ wavelength is placed in the optical path in front of the remaining two light reflectors. In this configuration example, the light reflector 22b is a prism and the polarization control means for performing polarization control of $\lambda/8$ wavelength are placed in the optical path in front of the two light reflectors 22a and 22c. The polarized light separation/combination means 21 is configured by sandwiching a polarized light separation/combination film 21a by a pair of prisms 21b and 21c.

In the configuration example shown in FIG. 6(e), two light reflectors are arranged in positions that are symmetrical with respect to the polarized light separation/combination means 21 so that the incoming angle and the outgoing angle of the polarization components become 22.5 degrees, and the polarization control means for performing polarization control of $\lambda/2$ wavelength is arranged in the optical path between the two light reflectors. In this configuration example, polarization control means 23h for performing polarization control of $\lambda/2$ wavelength is placed in the optical path between the light reflectors 22a and 22b.

In the configuration example shown in FIG. 6(f), two light reflectors are arranged in positions that are symmetrical with respect to the polarized light separation/combination means 21 so that the incoming angle and the outgoing angle of the polarization components become 22.5 degrees, and the polarization control means for performing polarization control of λ/10 wavelength is placed in the optical path in front of the two light reflectors and in the optical path between the two light reflectors. In this configuration example, polarization control means 23i and 23j for performing polarization control of λ/10 wavelength are placed on the light reflectors 22a and 22b and the polarization control means 23k for performing polarization control of λ/10 wavelength is placed in the optical path between the light reflectors 22a and 22b.

In general, a light loss due to a PDL (Polarization Dependent Loss) and a PMD (Polarization Mode Disperation) is a problem in a configuration where liquid crystal cells are used. A PDL is generated, for example, when the signal strength is weakened as the signal is transmitted through the electrodes provided on the liquid crystal cell. In a configuration where the light passes through liquid crystal cells frequently, a slight difference in the optical path for each polarized light sometimes generates a large polarization dependent loss. In addition, because the level of optical pulse dispersion differs according to the polarization modes of components at a right angle in the PMD, different-length optical paths increase the signal deterioration caused by this optical dispersion.

For this optical loss, a liquid crystal optical switch element used in the dynamic gain equalizer according to the present invention causes the polarization components to pass through the same optical path and, as a result, makes the optical path lengths and optical characteristics equal among the polarization components. Therefore, the PDL and the PMD can be minimized.

Figure 7:
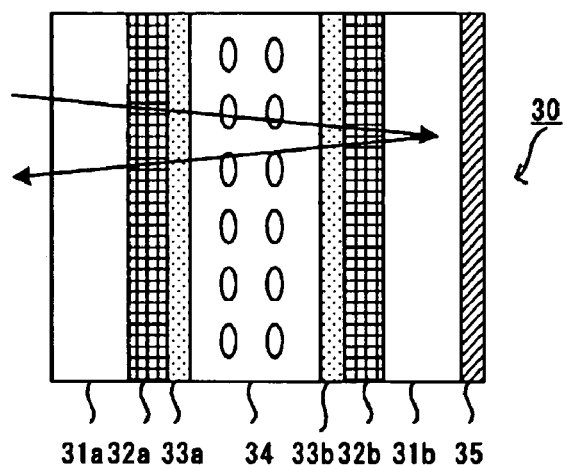
FIG. 7 is a diagram showing another general configuration of the dynamic gain equalizer according to the present invention.
Figure 7:
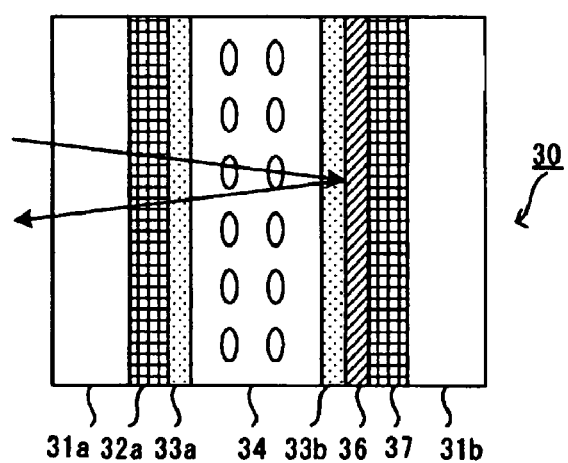
Figure 7:
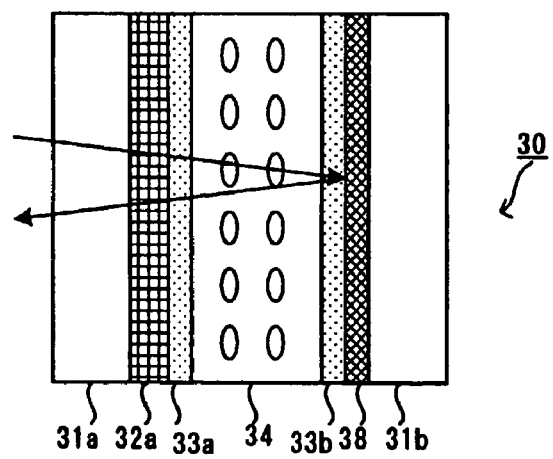

FIG. 7 shows an example of the configuration of a liquid crystal cell that can be applied to the polarization control means used in the liquid crystal optical switch according to the present invention.

The configuration in which a liquid crystal cell and a light reflector are combined will be described below. There are two combinations of a liquid crystal cell and a light reflector when the configuration is viewed from the light incoming side: a configuration in which the light reflector is placed outside the liquid crystal cell and a configuration in which the light reflector is placed inside the liquid crystal cell. FIG. 7(a) shows an example of the configuration in which the light reflector is placed outside the liquid crystal cell, and FIGS. 7(b) and 7(c) show an example of the configuration in which the light reflector is placed inside the liquid crystal cell.

Referring to FIG. 7(a), a liquid crystal cell 30 comprises, from the light incoming side, a substrate 31a such as a glass, a transparent electrode film 32a such as an ITO film, an alignment film 33a, a liquid crystal layer 34, an alignment film 33b, a transparent electrode film 32b, a substrate 31b, and an external light reflector 35. The external light reflector 35 is a dielectric multi-layer film or a metallic film of highly reflective materials such as aluminum or gold.

Referring to FIG. 7(b), a liquid crystal cell 30 comprises, from the light incoming side, a substrate 31a such as a glass, a transparent electrode film 32a such as an ITO film, an alignment film 33a, a liquid crystal layer 34, an alignment film 33b, an internal light reflector 36, a conductive film 37, and a substrate 31b. The internal light reflector 36 is a dielectric multi-layer film that applies an electric field through the conductive film 37. The conductive film 37 is a transparent electrode film made of ITO, and the substrate 31b is made of not only a transparent material such as a glass but also an opaque material.

Referring to FIG. 7(c), a liquid crystal cell 30 comprises, from the light incoming side, a substrate 31a such as a glass, a transparent electrode film 32a such as an ITO film, an alignment film 33a, a liquid crystal layer 34, an alignment film 33b, an internal light reflector 38, and a substrate 31b. The internal light reflector 38, which functions also as the lower electrode, is a metallic film. The substrate 31b is made of not only a transparent material such as a glass but also an opaque material.

In the liquid crystal cell having the configuration described above, an insulating film for preventing a short circuit between the top substrate and the bottom substrate can also be formed on the bottom of the alignment film (or on the top of the electrode). Also, in a configuration in which there is an air layer between the liquid crystal cell and the prism, it is desirable to form a reflection prevention film (AR: Antireflection Coating), made of a dielectric multi-layer film, to prevent an unnecessary reflection on the surface of the liquid crystal cell.

The alignment of the liquid crystal element can be an anti-parallel alignment or a parallel alignment. As the liquid crystal, a ferroelectric liquid crystal or a twisted nematic liquid crystal can be used.

The optical liquid crystal switch according to the present invention, which uses the liquid crystal cell described above, can perform the switch operation that controls the azimuthal angle of the incoming linearly-polarized light in two states: 90-degree rotation and 0-degree rotation that means no rotation. A liquid crystal cell capable of gradient control, if used, could constitute a variable optical attenuator that operates on polarization in an intermediate state.

When optical switching is performed using the switching operation of a liquid crystal cell, the response speed of the liquid crystal cell depends on the thickness of the liquid crystal cell. The configuration of the liquid crystal optical switch according to the present invention, in which a plurality of liquid crystal cells are used to perform the polarization change of λ/2 wavelength, can make the liquid crystal cells thinner and improve the response time.

The response speed is improved by the square of a reduction in the thickness. For example, as compared with that of the same type of reflective liquid crystal cell, the response speed becomes four times faster when the thickness of each liquid crystal cell becomes ½, and nine times faster when the thickness of each liquid crystal cell becomes ⅓.

Next, a transmissive type dynamic gain equalizer sending out a light, whose light intensity is changed, into a direction different from the incoming direction will be described with reference to FIG. 8. FIG. 8(a) shows an example of the configuration in which the light intensity monitor function is not provided, and FIG. 8(b) shows an example of configuration in which the light intensity monitor function is provided.

In the example of the configuration shown in FIG. 8(a), a dynamic gain equalizer 1D according to the present invention comprises a spectroscope 4 that separates an incoming light, a liquid crystal optical switch 5B that receives the separated components separated by the spectroscope 4, a multiplexer 20 that combines multiple optical wavelengths of a light whose intensity is changed by the liquid crystal optical switch 5B and which passes through the switch, and optical elements 3 (lenses 3a, 3b) arranged between the incoming end and the spectroscope 4 and between the spectroscope 4 and the liquid crystal optical switch 5B. The multiplexer 20 has a configuration in which a thin film filter that multiplexes a light and then demultiplexes the light or a configuration in which a lens 3*b*, a spectroscope 4, a lens 3*a*, and a collimator 6*a* are arranged to form a de-multiplexed light onto an optical fiber 2*b*.

An incoming light can enter from the optical fiber 2*a*. The light passing through the optical fiber 2*a* passes through the lens 3*a* via the collimator 6*a*, connected to the end of the optical fiber 2*a*, and is introduced into the spectroscope 4. The optical components separated by the spectroscope 4 into specific wavelengths are introduced into the liquid crystal optical switch 5B through the lens 3*b*.

The transmissive type liquid crystal optical switch 5B changes the light intensity of each received wavelength component and allows the light, whose intensity is changed, to pass through. The light passing through the liquid crystal optical switch 5B is collected by the multiplexer 20 and introduced into the optical fiber 2*b*. The liquid crystal optical switch 5B changes the light intensity of each wavelength to allow the light intensity of the light, introduced into the optical fiber 2*b*, to have predetermined wavelength characteristics. For example, if the intensity of a light entering from the optical fiber 2*a* varies because the gain of the light-amplifying gain medium depends on the wavelengths, the liquid crystal optical switch 5B changes the received light intensity and sends out the light so that the wavelength dependency of the gain is compensated for.

The transmissive type liquid crystal optical switch 5B, which can have an outgoing end different from the incoming end, eliminates the need for a circulator and a 2-core collimator for separating a light.

Figure 8:
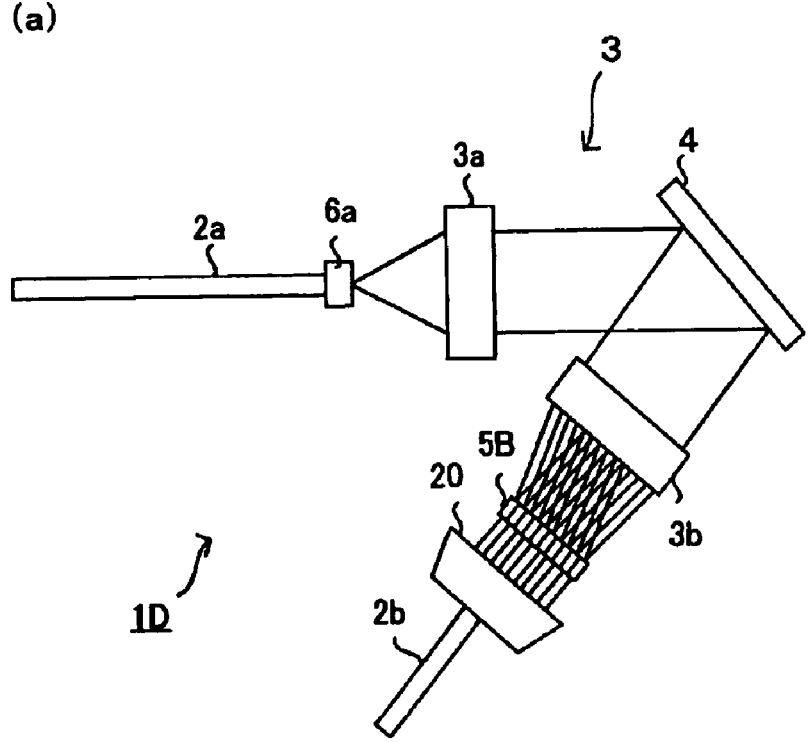
FIG. 8 is a diagram showing a transmissive type dynamic gain equalizer that outputs a light, whose light intensity is changed, into a direction different from the incoming direction.
Figure 8:
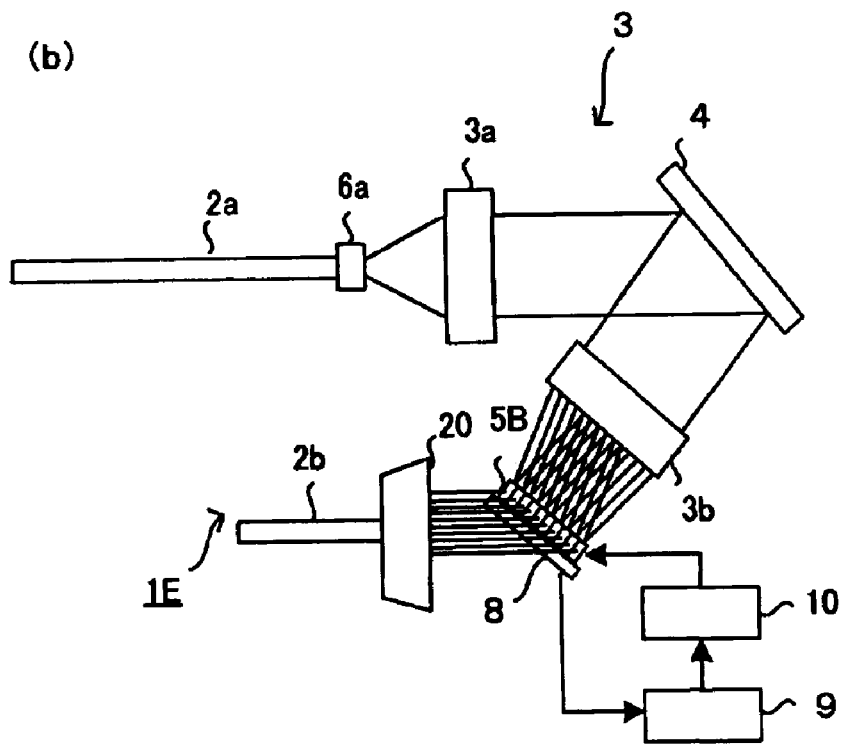

FIG. 8(*b*) shows an example of the configuration in which the light intensity monitor function is provided to control the liquid crystal optical switch 5B using the monitored light intensity.

Referring to FIG. 8(*b*), the liquid crystal optical switch 5B has a light intensity detector such as a photodiode array (PDA) 8. The liquid crystal optical switch 5B changes the light intensity of the incoming light, sends it out into a direction different from the incoming direction and, at the same time, introduces the remaining light, whose intensity is changed, into a direction different from the incoming direction and the outgoing direction. The photodiode array 8 captures the light other than the outgoing light to detect the light intensities of the optical signals of the wavelengths. A monitor unit 9 monitors the signals detected by the photodiode array 8. Control means 10 controls the liquid crystal optical switch 5B based on the monitor output. The monitor output may also be displayed on a display unit not shown. It is also possible not to provide the control means 10 but to display only the monitor output. The optical fibers 2*a* and 2*b* are single-mode fibers.

Next, the configuration of a transmissive type liquid crystal optical switch that introduces the outgoing right into a direction different from that of the incoming light will be described with reference to FIG. 9. Like the reflective type liquid crystal optical switch described above, the transmissive type liquid crystal switch can also be arranged in one dimension and two dimensions. The following described an example of a one-dimensional arrangement but omits the description of the two-dimensional arrangement.

Figure 9:
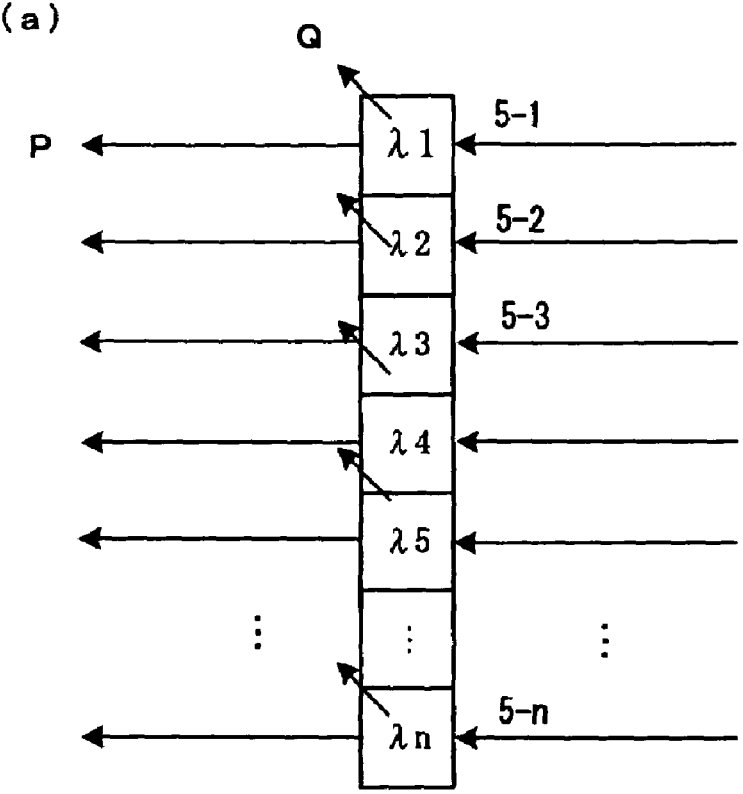
FIG. 9 is a diagram showing an example of the configuration of the transmissive type liquid crystal optical switch that introduces the outgoing light into a direction different from that of the incoming light.
Figure 9:
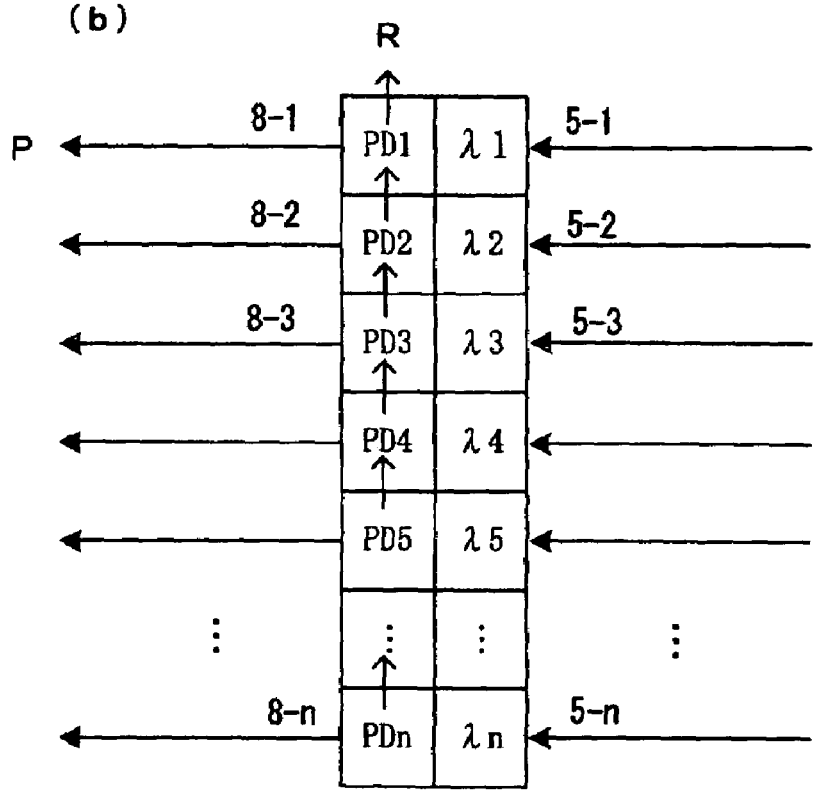

FIG. 9(*a*) shows the one-dimensional arrangement of a plurality of liquid crystal optical switch elements constituting a liquid crystal optical switch. The plurality of liquid crystal optical switch elements 5-1, 5-2, 5-3, . . . , 5-*n* are arranged along the line of components separated by the spectroscope with the elements corresponding to the wavelengths $\lambda 1, \lambda 2, \lambda 3, \ldots, \lambda n$. In this configuration, the liquid crystal switch elements 5-1, 5-2, 5-3, . . . , 5-*n* change the light intensities of the optical signals of the wavelengths $\lambda 1, \lambda 2, \lambda 3, \ldots, \lambda n$ and output the light, whose light intensity is changed, into a predetermined direction different from the incoming direction (for example, in the arrow direction of P in FIG. 9). The remaining light is introduced into a direction different from the incoming direction and the outgoing direction (for example, in the arrow direction of Q in FIG. 9). Note that the positional relation of the direction of P and the direction of Q shown in FIG. 9 are shown only for the sake of description but are not limited to this positional relation. Although a plurality of liquid crystal optical switch elements can be configured in the two-dimensional arrangement, the description is omitted here.

Next, the configuration of a transmissive type liquid crystal optical switch with a photodiode array will be described with reference to FIG. 9(*b*). Here, an example of the one-dimensional arrangement of a plurality of liquid crystal optical switch elements is shown. This liquid crystal optical switch is formed by adding a photodiode array 8 to a one-dimensional liquid crystal optical switch with the same configuration as that shown in FIG. 9(*a*). The photodiode array 8 is at one output end of the liquid crystal optical switch elements.

A plurality of liquid crystal optical switch elements 5-1, 5-2, 5-3, . . . , 5-*n* are arranged along the line to which the spectroscope outputs the separated optical components, and photodiode arrays 8-1, 8-2, 8-3, . . . , 8-*n* are provided next to the liquid crystal optical switch elements. The liquid crystal optical switch elements 5-1, 5-2, 5-3, . . . , 5-*n* change the light intensities of the wavelengths $\lambda 1, \lambda 2, \lambda 3, \ldots, \lambda n$ and send out the light, whose light intensity is changed, into a predetermined direction different from the incoming direction (For example, into the direction of arrow P in FIG. 9). The remaining light is introduced into a direction different from the incoming direction and the outgoing direction. The photodiode arrays 8-1, 8-2, 8-3, . . . , 8-*n* detect the light intensities of the remaining light for the wavelengths $\lambda 1, \lambda 2, \lambda 3, \ldots, \lambda n$ and output the detection signals (for example, into the direction of arrow R in FIG. 9).

Next, the configuration mode of a liquid crystal optical switch element used for the transmissive type liquid crystal optical switch, which introduces the outgoing light onto a direction different from that of the incoming light, will be described with reference to FIG. 10.

Figure 10:
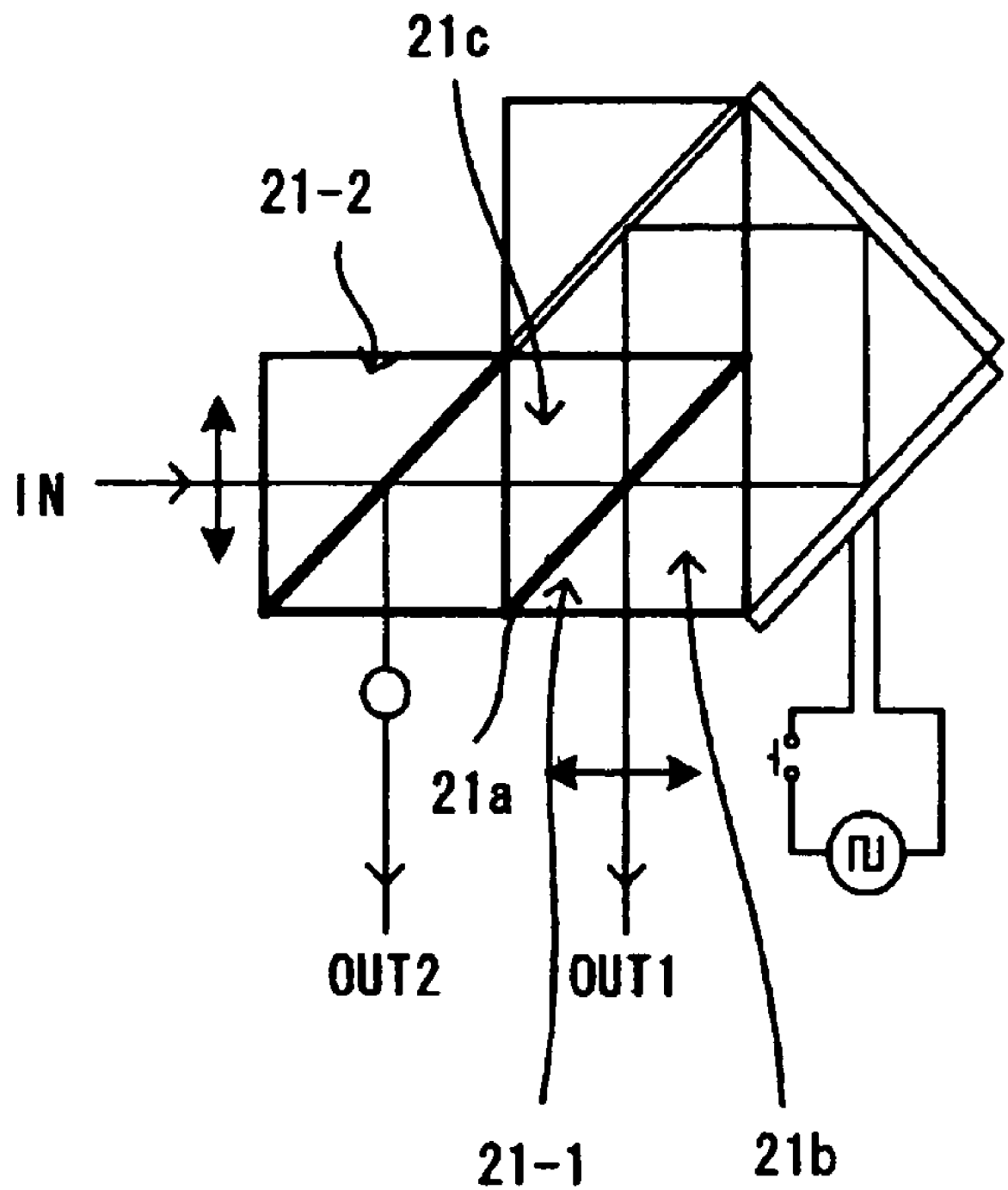
FIG. 10 is a diagram showing an example of a liquid crystal optical switch formed only by half polarization.
Figure 11:
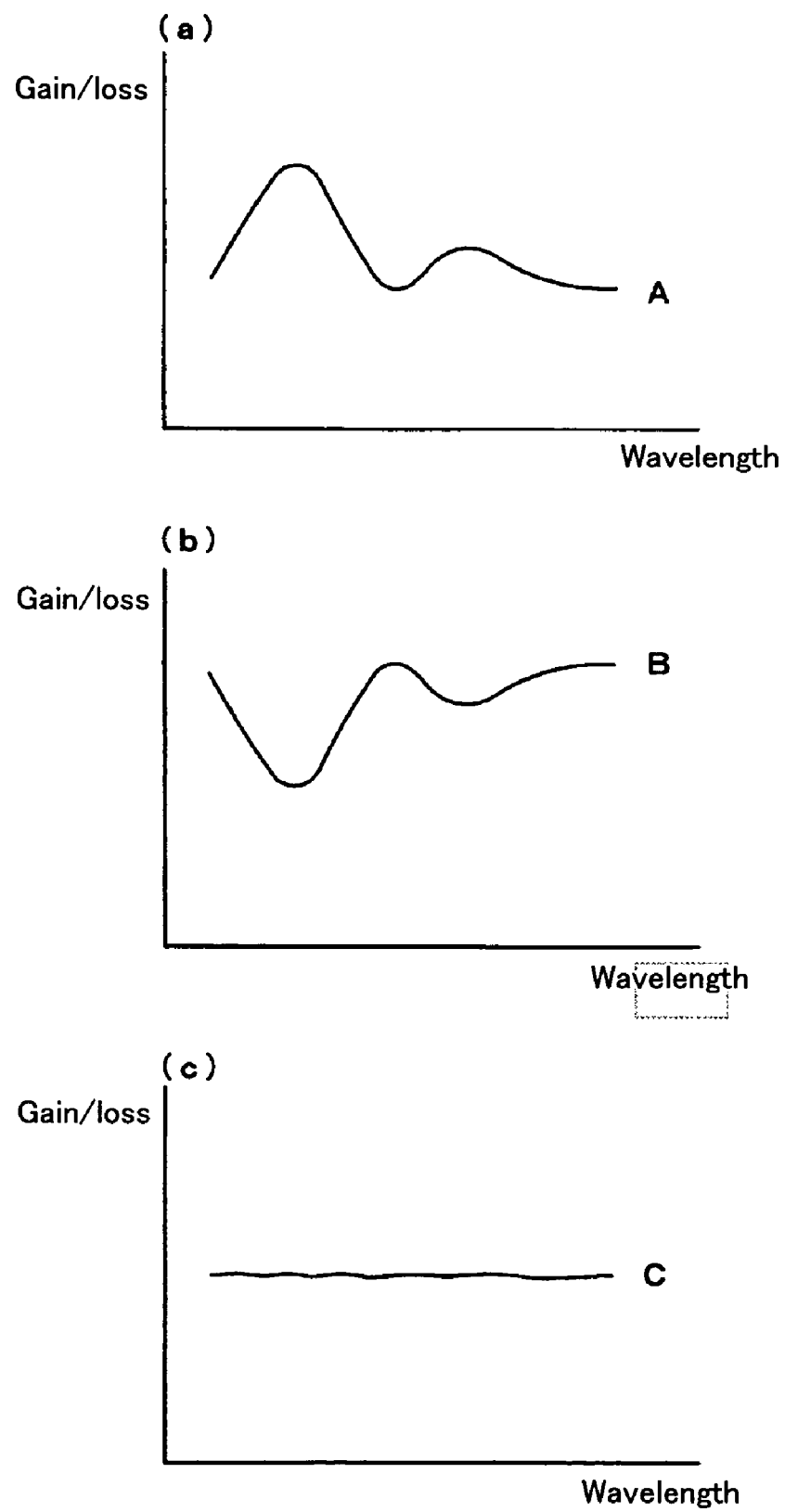
FIG. 11 is a diagram showing the filtering characteristics of a conventional loss filter.
Figure 12:
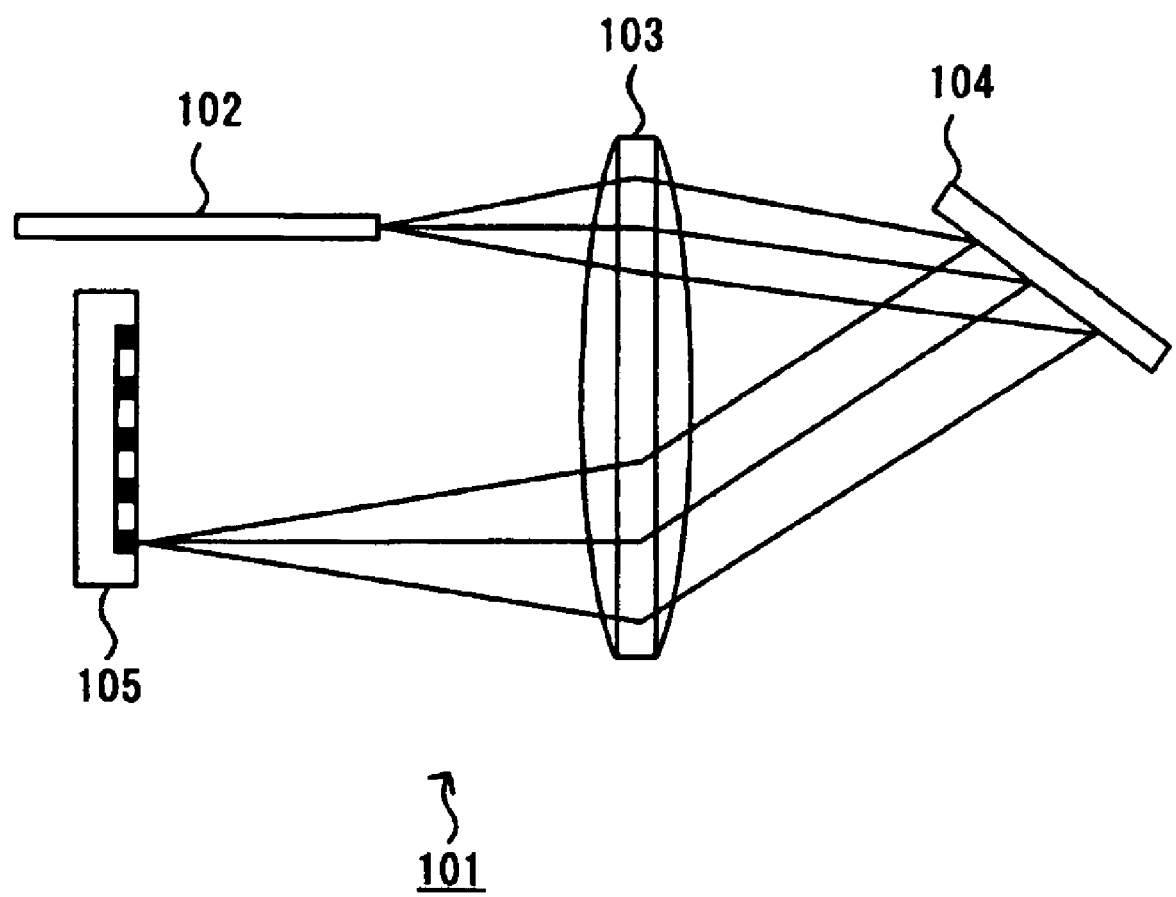
FIG. 12 is a diagram showing the overview of the configuration of a dynamic gain equalizer using the MEMS which is conventionally proposed.

FIG. 10 shows an example, which is the polarization dependent liquid crystal optical switch. Like the liquid crystal optical switch shown in FIG. 6(*d*), the liquid crystal optical switch shown in FIG. 10 has a polarized light separation/combination means 21-2 at one end of polarized light separation/combination means 21-1 of liquid crystal optical switch element 5. One end of the polarized light separation/combination means 21-2 is the input end (IN), and the other end of the polarized light separation/combination means 21-1 and the other end of the polarized light separation/combination means 21-2 are the output ends (OUT2 and OUT1, respectively). For example, when a light enters from the input end IN, this configuration outputs the light from the output end OUT1 if the liquid crystal optical switch 5 does not perform polarization conversion, and from the output end OUT2 if the liquid crystal optical switch 5 performs polarization conversion. One of the output end OUT1 and the output end OUT2 is the outgoing end, with the other end used for monitoring.

The dynamic equalizer according to the present invention can be applied for compensating for the wavelength dependence of a gain, for example, when the gain of the gain medium, which is used with an EDFA (Erbium-Doped Fiber Amplifier) for the 1.55 µm band long-distance transmission or a metro area network, varies according to the wavelength.

The dynamic equalizer according to the present invention, which uses liquid crystal optical switches instead of mechanical elements such as MEMS for changing the light intensity, can reduce the number of parts or adjustment points and lowers the cost.

A liquid crystal optical switch element used for the dynamic equalizer according to the present invention allows the two polarization components, separated by a polarization beam splitter, to travel through the same optical path and therefore reduces the PDL and the PMD.

In addition, the liquid crystal optical switch used for the dynamic equalizer according to the present invention, which has the output of a photodiode array on one side, can have the optical spectrum analyzer function.

As described above, the dynamic equalizer according to the present invention selectively controls the signals of specific wavelengths and equalizes the light intensities of the signals of the wavelengths without using a mechanism having a mechanical moving part such as a MEMS. Because the dynamic equalizer has no mechanical moving part, controllability and reliability can be increased.

The dynamic gain equalizer according to the present invention allows the light, which remains after compensation, to exit the equalizer. Therefore, the problem of light scattering or heat generation can be solved.

In addition, the dynamic gain equalizer according to the present invention monitors the light that remains after compensation, eliminating the need for separately providing an optical spectrum analyzer for monitoring the light. This configuration also eliminates the need for optical branches for monitoring the light, thus preventing the light intensity from being decreased by optical branches.

INDUSTRIAL APPLICABILITY

The dynamic gain equalizer according to the present invention is useful for a gain equalizer that compensates for a light intensity variation that is caused because the wavelength dependence of an optical fiber or a gain medium changes over time during wavelength division multiplexing.

The invention claimed is:

1. A dynamic gain equalizer comprising:
a spectroscope that separates an incoming light into spectral components;
a liquid crystal optical switch that receives the spectral components separated by said spectroscope; and
a lens system arranged between an incoming end and said spectroscope and/or between said spectroscope and said liquid crystal optical switch,
wherein said liquid crystal optical switch comprises a polarizing beam splitter that splits the received spectral components into two linearly polarized optical components that propagate in different paths, the different paths being at a right angle to each other; and at least one reflective type liquid crystal cell that controls the linearly polarized optical components split by said polarizing beam splitter and thereby changes light intensities of the received spectral components for each wavelength and sends them out for selectively changing the light intensities of specific wavelengths.

2. The dynamic gain equalizer according to claim 1, wherein said liquid crystal optical switch has a plurality of liquid crystal optical switch elements that are linearly arranged along the optical components separated by said spectroscope.

3. The dynamic gain equalizer according to claim 2, wherein said liquid crystal optical switch elements are arranged in two dimensions in the line direction and in a direction at a right angle to the line direction.

4. The dynamic gain equalizer according to claim 2 or 3, wherein said liquid crystal optical switch elements reflect and send out the light, whose light intensity is changed, into an incoming direction.

5. The dynamic gain equalizer according to claim 2 or 3, wherein said liquid crystal optical switch elements send out the light, whose light intensity is changed, into a direction different from an incoming direction.

6. The dynamic gain equalizer according to claim 4,
wherein said liquid crystal optical switch elements each have an optical element, which is composed of a liquid crystal cell and a light reflector, on any two sides that are at a right angle to a polarizing beam splitter and
a polarization direction of polarization components of said liquid crystal cell is controlled with another side of said polarizing beam splitter as an incoming end and an outgoing end of the light.

7. The dynamic gain equalizer according to claim 4,
wherein said liquid crystal optical switch elements each comprise a polarizing beam splitter, at least two light reflectors, and a liquid crystal cell that controls a polarization direction, and
said polarizing beam splitter and said light reflectors are arranged so that two polarization components, separated by the polarizing beam splitter, travel along the same optical path but into different traveling directions, re-enter the polarizing beam splitter, and are combined therein and, at the same time, said liquid crystal cell is arranged in the optical path to control the polarization direction of the polarization components though said liquid crystal cell.

8. The dynamic gain equalizer according to claim 6, wherein said liquid crystal cell controls an azimuthal angle of an incoming linearly polarized light in one of two angular positions, 0-degree rotation and 90-degree rotation, or in any angular position.

9. The dynamic gain equalizer according to one of claims 1-3, wherein said liquid crystal optical switch further comprises a photo detection element that detects a light intensity of a remaining light of an outgoing light which is sent out with the light intensity changed, and said photo detection element constitutes an optical spectrum analyzer that detects a light intensity complementary to the light intensity of the outgoing light for each wavelength.

10. The dynamic gain equalizer according to claim 6, wherein said liquid crystal optical switch elements have a photodiode array, which detects the light intensity, at one end of the outgoing end of the polarizing beam splitter, and the photodiode array constitutes an optical spectrum analyzer that detects a light intensity complementary to the light intensity of the outgoing light for each wavelength.

11. The dynamic gain equalizer according to claim 9, wherein said liquid crystal optical switch elements are controlled based on a detection output of said optical spectrum analyzer.

* * * * *